(12) United States Patent
Shmuylovich et al.

(10) Patent No.: US 8,887,046 B2
(45) Date of Patent: Nov. 11, 2014

(54) WHITEBOARD PRESENTATION OF INTERACTIVE AND EXPANDABLE MODULAR CONTENT

(75) Inventors: Leonid Shmuylovich, St. Louis, MO (US); Joshua Salcman, St. Louis, MO (US)

(73) Assignee: Pearson Education, Inc., Upper Saddle River, NJ (US)

( * ) Notice: Subject to any disclaimer, the term of this patent is extended or adjusted under 35 U.S.C. 154(b) by 169 days.

(21) Appl. No.: 13/129,565

(22) PCT Filed: Nov. 16, 2009

(86) PCT No.: PCT/US2009/064608
§ 371 (c)(1),
(2), (4) Date: May 27, 2011

(87) PCT Pub. No.: WO2010/057106
PCT Pub. Date: May 20, 2010

(65) Prior Publication Data
US 2011/0225494 A1 Sep. 15, 2011

Related U.S. Application Data

(60) Provisional application No. 61/114,890, filed on Nov. 14, 2008.

(51) Int. Cl.
*G06F 3/048* (2013.01)
*G06Q 10/10* (2012.01)
*G06F 3/0488* (2013.01)

(52) U.S. Cl.
CPC .......... *G06Q 10/109* (2013.01); *G06F 3/04883* (2013.01)
USPC ...................................... 715/705

(58) Field of Classification Search
USPC ...................................... 715/705
See application file for complete search history.

(56) References Cited

U.S. PATENT DOCUMENTS 7,360,158 B1 4/2008 Beeman
2002/0018075 A1 2/2002 Maulik et al.
(Continued)

FOREIGN PATENT DOCUMENTS

GB 2477456 8/2011
IN 3274/CHENP/2011 A 7/2012
(Continued)

OTHER PUBLICATIONS

International Search Report mailed Jun. 23, 2010 for PCT/US2009/064608 filed Nov. 16, 2009, 4 pages.
(Continued)

*Primary Examiner* — Peiyong Weng
(74) *Attorney, Agent, or Firm* — Kilpatrick Townsend & Stockton LLP

(57) ABSTRACT

In one aspect, described herein is a method for creating an interactive expandable multimedia tutorial. The method includes receiving a plurality of tutorial elements, generating a first user interface including a plurality of regions that correspond to each of the plurality of tutorial elements, presenting the first user interface on a display device, receiving a request to access the one or more additional tutorial elements, accessing the one or more additional tutorial elements, generating a second user interface comprising one or more regions that correspond to each of the accessed one or more additional tutorial elements, and presenting the second user interface on the display device, wherein the second user interface is displayed simultaneously with the first user interface, and wherein at least a portion of the first user interface remains visible to the user to enable navigation between the second user interface and the first user interface.

22 Claims, 4 Drawing Sheets

(56) References Cited

U.S. PATENT DOCUMENTS

| | | | |
|---|---|---|---|
| 2004/0263636 A1* | 12/2004 | Cutler et al. | 348/211.12 |
| 2005/0114776 A1* | 5/2005 | Wood et al. | 715/709 |
| 2007/0061722 A1 | 3/2007 | Kronlund et al. | |
| 2007/0100799 A1* | 5/2007 | Rose et al. | 707/3 |
| 2007/0160969 A1* | 7/2007 | Barton et al. | 434/323 |
| 2008/0282285 A1* | 11/2008 | Thomas et al. | 725/32 |

FOREIGN PATENT DOCUMENTS

| | | |
|---|---|---|
| JP | 2007-080265 A | 3/2007 |
| WO | 2010-057106 | 5/2010 |

OTHER PUBLICATIONS

Written Opinion mailed Jun. 23, 2010 for PCT/US2009/064608 filed Nov. 16, 2009, 4 pages.

International Preliminary Report on Patentability issued May 17, 2011 for PCT/US2009/064608 filed Nov. 16, 2009, 5 pages.

Examination Report dated Jul. 2, 2013 for UK Patent Application #GB1107738.5 filed Nov. 16, 2009, 4 pages.

Examination Report dated Feb. 24, 2014 for UK Patent Application #GB1107738.5 filed Nov. 16, 2009, 4 pages.

* cited by examiner

WHITEBOARD PRESENTATION OF INTERACTIVE AND EXPANDABLE MODULAR CONTENT

CROSS-REFERENCE TO RELATED APPLICATIONS

This application is a 35 U.S.C. §371 national stage application of PCT/US2009/064608, filed Nov. 16, 2009, which claims priority to U.S. Provisional Application No. 61/114,890, Nov. 14, 2008, the entireties of which are hereby incorporated by reference for all purposes.

BACKGROUND

Aspects of the invention relates generally to a system and method for creating an interactive expandable multimedia application, and more specifically to creating an interactive expandable multimedia educational tutorial and training module via a virtual whiteboard.

Virtual whiteboard computer systems allow participants in mutually disparate geographical locations to participate in a collaborative activity in real time. Generally each participant has access to a computer means that is networked with computers of other participants. A display device accessible to each participant acts as a "virtual whiteboard" allowing the participants to submit and receive drawings and alternative graphical or other information. For example, each participant may have a copy of a common drawing on his or her virtual whiteboard, and can edit or otherwise amend that drawing, such markups being immediately transmitted to the other participants to maintain in a consistent state the common drawing. These conventional virtual whiteboard systems are commonly used in educational environments, to facilitate a transfer of information from a teacher to a student, and in group discussions such as business meetings, where ideas need to be communicated between participants. The virtual whiteboard provides a convenient surface on which concepts can be graphically expressed, by way of notes, drawings, charts, and the like.

Conventional virtual whiteboard systems also provide training and educational tutorials that can be delivered through the Internet, as well as through offline software and analog or digital audio/video media. However, conventional whiteboard systems deliver virtually identical content to all users no matter the platform for each user. Thus, these conventional virtual whiteboard cannot properly address a vast array of needs and/or questions a user may have because of the limited flexibility of these conventional virtual whiteboard systems. For example, a user may require a definition of a specific term used in an educational tutorial, while another user may require several concepts in a tutorial explained in greater depth. However, conventional virtual whiteboard systems do not allow the ability for each user to interact with the virtual whiteboard system on this level.

BRIEF DESCRIPTION

In one aspect, described herein is a system for creating an interactive expandable multimedia tutorial. The system includes a memory area for storing organization information, tutorial elements, and user information. The system further includes a processor programmed to access a plurality of tutorial elements from the memory area, wherein at least one of the plurality of tutorial elements includes a video of a presenter describing a lesson, wherein at least one of the plurality of tutorial elements is configured to enable access to one or more additional tutorial elements, and wherein the one or more additional tutorial elements further define one or more of the plurality of tutorial elements, generate a first user interface including a plurality of regions that correspond to each of the accessed plurality of tutorial elements, receive a request to access the one or more additional tutorial elements, pause the video upon receiving the request to access the one or more additional tutorial elements, access the one or more additional tutorial elements, and generate a second user interface including one or more regions that correspond to each of the accessed one or more additional tutorial elements, wherein the second user interface is configured to be superimposed over the first user interface, and wherein at least a portion of the first user interface is configured to remain visible to the user to enable navigation between the second user interface and the first user interface.

In another aspect, described herein is a method for creating an interactive expandable multimedia tutorial. The method includes receiving, by a processor, a plurality of tutorial elements, wherein at least one of the plurality of tutorial elements is configured to enable access to one or more additional tutorial elements, generating a first user interface including a plurality of regions that correspond to each of the plurality of tutorial elements, presenting the first user interface on a display device, receiving, from a user, a request to access the one or more additional tutorial elements, accessing the one or more additional tutorial elements, generating a second user interface including one or more regions that correspond to each of the accessed one or more additional tutorial elements, and presenting the second user interface on the display device, wherein the second user interface is displayed simultaneously with the first user interface, and wherein at least a portion of the first user interface remains visible to the user to enable navigation between the second user interface and the first user interface.

In another aspect, described herein are one or more computer-readable media having computer-executable components. The components include a tutorial element component that when executed by at least one processor causes the processor to receive a plurality of tutorial elements, wherein at least one of the plurality of tutorial elements include a video of a presenter describing a lesson, and wherein at least one of the plurality of tutorial elements is configured to enable access to one or more additional tutorial elements, a user interface component that when executed by at least one processor causes the processor to generate a first user interface including a plurality of regions that correspond to each of the plurality of tutorial elements, a display component configured to enable the processor to present the first user interface on a display device, and an interface component that when executed by at least one processor causes the processor to, receive, from a user, a request to access the one or more additional tutorial elements and pause the video upon receiving the request to access the one or more additional tutorial elements, wherein the user interface component further causes the processor to access the one or more additional tutorial elements, wherein the user interface component further causes the processor to generate a second user interface including one or more regions that correspond to each of the accessed one or more additional tutorial elements, and wherein the display component is further configured to enable the processor to present the second user interface simultaneously with the first user interface, and wherein at least a portion of the first user interface remains visible to the user to enable navigation between the second user interface and the first user interface

BRIEF DESCRIPTION OF THE DRAWINGS

The present disclosure is described in detail below with reference to the attached drawing figures.

DETAILED DESCRIPTION

Embodiments of the disclosure create an interactive expandable multimedia application. In some embodiments, an interactive expandable multimedia educational tutorial and training module is created via a virtual whiteboard. Embodiments of the present disclosure provide users an ability to choose from a variety of paths through a set of applications, for example, educational tutorials and training modules, and allow for each user's specific path to be tracked and reported. The educational content platform allows for a set of educational modules to be organized and presented in a hierarchical and nested architecture. Different users may need to explore different levels of the hierarchy at different stages of a lesson explained in the educational tutorial or training module. Because the user can choose to select among available branching points, the user is able to tailor an experience of a tutorial to the user's own needs, while keeping present an original educational tutorial or training module that brought the user to the branching point.

Figure 1:
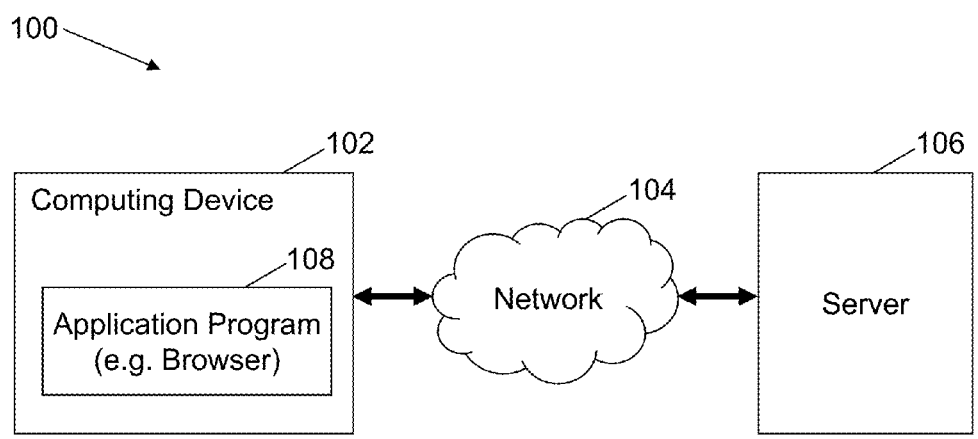
FIG. 1 is an exemplary operating environment for use in creating and/or operating an interactive expandable multimedia tutorial.

Referring initially to FIG. 1, an exemplary operating environment is shown and designated generally as virtual whiteboard system 100. Virtual whiteboard system 100 is but one example of a suitable environment and is not intended to suggest any limitation as to the scope of use or functionality of the present disclosure. Neither should virtual whiteboard system 100 be interpreted as having any dependency or requirement relating to any one or combination of components illustrated herein. Virtual whiteboard system 100 includes a computing device 102 connected to a server 106, or other computing device, via network 104. Server 106 includes an educational content platform (e.g., training modules or interactive expandable multimedia tutorials) that may be delivered to computing device 102 via network 104, for example, by way of an Internet Web Browser. In embodiments, computing device 102 includes one or more applications 108 such as a web browser, to provide an execution environment for executable code associated with the educational content platform. Additionally, the educational content platform may be delivered on a mobile device, television, or other suitable visual media delivery system that includes some interface that accepts user input.

Figure 2:
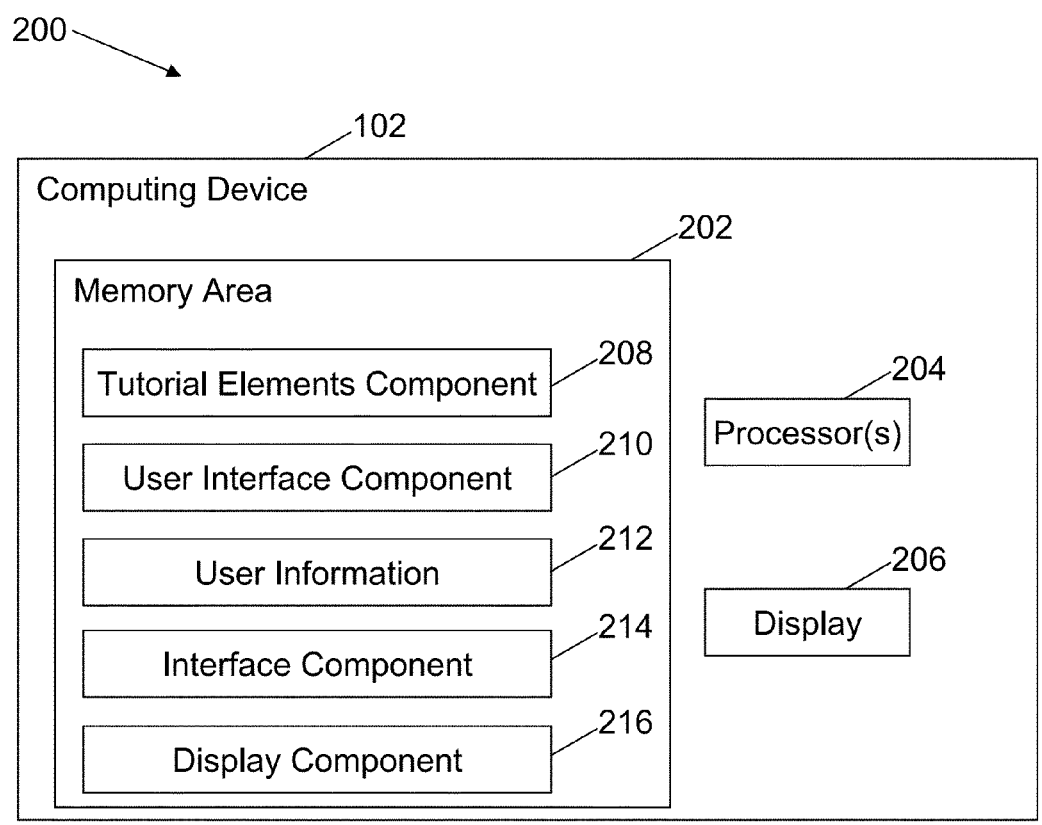
FIG. 2 is an exemplary block diagram of a computing device having a memory area storing components for creating and/or operating an interactive expandable multimedia tutorial.

Referring next to FIG. 2, an exemplary block diagram 200 illustrates computing device 102 having a memory area 202, at least one processor 204, and a display 206. The memory area 202, or other computer-readable medium or media, stores tutorial element component 208, user interface component 210, interface component 212, user information component 214, and display component 216.

Display component 216 is configured to present one or more user interfaces to a user via display 206. Display 206 may be a display device separate from computing device 102, a display integrated into computing device 102, a capacitive touch screen display, or a non-capacitive display. User input functionality may also be provided in display 206, where display 206 acts as a user input selection device such as in a touch screen.

Tutorial element component 208 is configured to receive a plurality of tutorial elements. In embodiments tutorial elements may include a combination of interactive and non-interactive multimedia, including but not limited to text, video, audio, graphics, slide shows, and animations. For example, in an application that includes numerous images and a single video file, user interaction with the video component may result in no direct response from virtual whiteboard system 100, while interactions directed to individual images may have a variety of programmed consequences. In this particular example, the images would constitute the interactive elements, while the video would constitute a non-interactive element.

User interface component 210 is configured to generate a first user interface that includes a plurality of regions that correspond to each of the plurality of tutorial elements. For example, each of the plurality of regions may include a window that houses a presentation, a window that houses a continuously-updating diagram, and a summary window describing a tutorial. One of the plurality of regions may also include a window that includes synchronized tutorial elements. For example, a non-interactive video presentation may be synchronized and coordinated with a set of interactive graphical, video, or audio. The window that includes synchronized tutorial elements may be positioned in a scrollable frame around or adjacent to a video presentation.

Interface component 212 is configured to deliver functionality of a user interface to a user by enabling user interaction with tutorial elements. For example, a user may request access and/or more information regarding a specific tutorial element. User interaction with tutorial elements may include, but is not limited to, rolling-over or selecting a tutorial element through mouse actions, mouse commands, keyboard commands, voice commands, touch-screen interfaces, or other related interfaces.

Processor 204 executes computer-executable instructions for implementing aspects of the disclosure. For example, in one embodiment, processor 204 receives a plurality of tutorial elements, generates a first user interface that includes a plurality of regions that correspond to each of the plurality of tutorial elements, presents the first user interface on a display device, receives, from a user, a request to access one or more additional tutorial elements, pauses the video upon receiving the request to access the one or more additional tutorial elements, accesses the one or more additional tutorial elements, generates a second user interface including one or more regions that correspond to each of the accessed one or more additional tutorial elements, and presents the second user interface on the display device.

In some embodiments, processor 204 is transformed into a special purpose microprocessor by executing computer-executable instructions or by otherwise being programmed. For example, the processor 204 is programmed with instructions such as illustrated next in FIG. 3.

Figure 3:
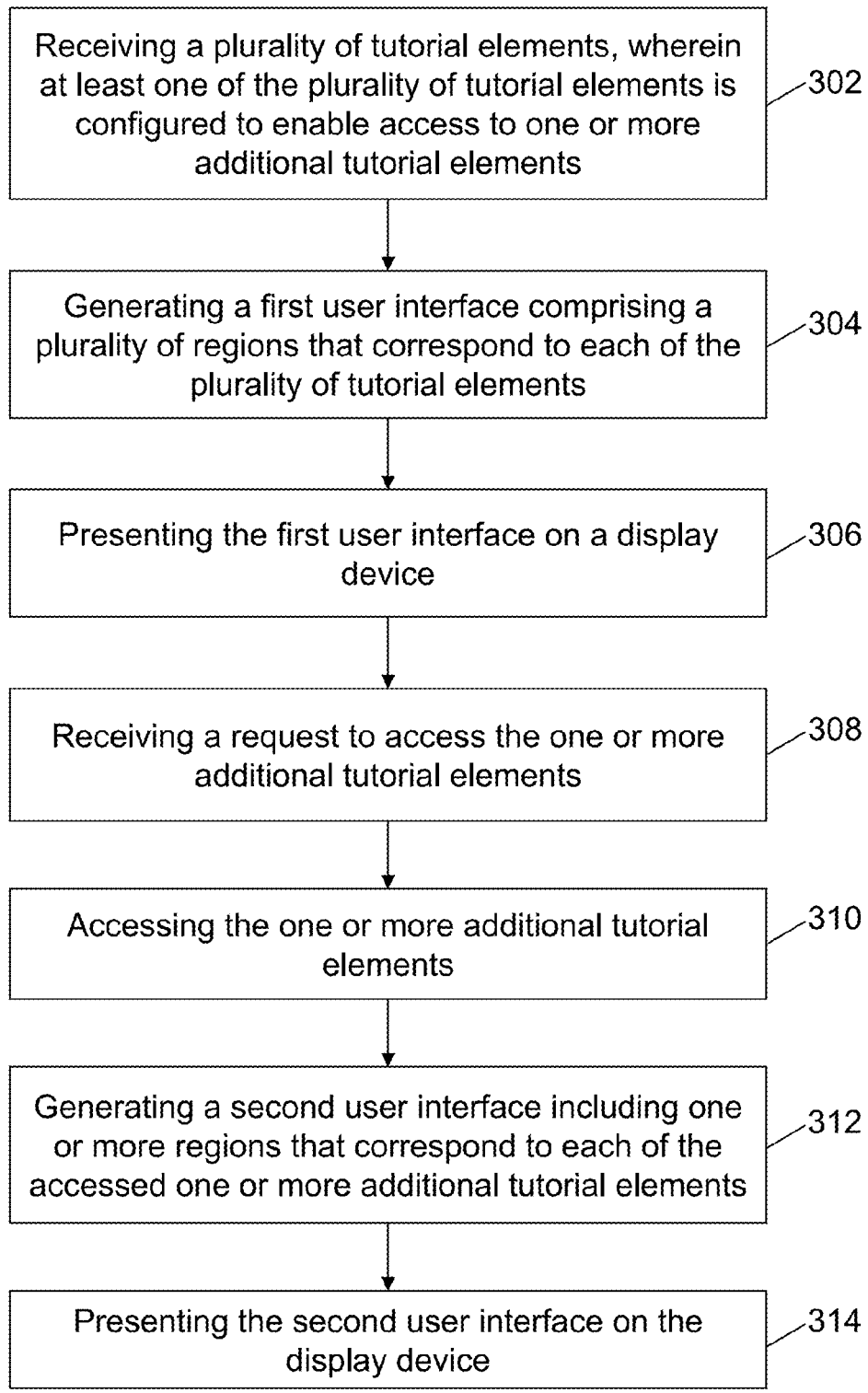
FIG. 3 is a flow diagram of an exemplary method for creating an interactive expandable multimedia tutorial.

With reference now to FIG. 3, an exemplary flow diagram 300 illustrates a method for creating an interactive expandable multimedia educational. Upon a user initiating a tutorial, at 302, a plurality of tutorial elements are received by processor 204. A tutorial element may include a video presentation, graphics corresponding to specific points in a video presentation, text, audio, image, animation, or video descriptors. In one embodiment, at least one of the plurality of tutorial elements is configured to enable access to one or more additional tutorial elements.

As mentioned above, tutorial elements may include a combination of interactive and non-interactive multimedia, including but not limited to text, video, audio, graphics, slide shows, and animations. Thus, tutorial elements may represent each logical step, conceptual point, or educational deliverable in a given tutorial. In one embodiment, tutorial elements are synchronized. Synchronizing tutorial elements provides a user with a preview or outline of a tutorial. For example, a video presentation of a lesson detailing a solution of a particular physics problem may be synchronized with graphical tutorial elements corresponding to equations, logical expressions, arguments, and physics principles that are discussed in the video presentation. At a start of the tutorial, steps for drawing a visual representation of the problem variables and problem statement may be presented to the user. For example, a presenter may draw a diagram in a video, and images corresponding to successive iterations of the drawn diagram are loaded into a separate region (e.g., a separate window) of the user interface. For example, if a source video or media file includes a presenter writing and drawing a series of words, diagrams, and symbols on a board, then the board may be touch sensitive or may contain an interface for digitally capturing the timing and content of the presenter's actions. These actions may then be compiled and synchronized with the resulting source video or media file. Thus, in this exemplary embodiment, individual steps of a lesson pursued by the presenter are recapitulated as a sequence of individual images, residing in this separate region. In one embodiment, updating successive iterations of the lesson includes highlighting portions of an image that correspond to relevant steps in the lesson. In this example, automated image processing techniques are employed to capture and digitize drawings and incorporate them into a set of sequential tutorial elements (e.g., images). In a further embodiment, images corresponding to steps in a lesson that have yet to be completed are grayed out but still visible.

A combination, synchronization, and coordination of separate tutorial elements may be achieved in several ways. For example, all the tutorial elements may be combined together to create a single multimedia file. In another embodiment, the resulting file requires no additional information to synchronize separate tutorial elements, because all aspects of presentation are hard-coded into a resulting multimedia file. For example, for a tutorial including a video presentation with related graphical or multimedia assets, a single new video file that merges the video presentation and a timed presentation of graphical assets may be created.

In another embodiment, synchronization and coordination of separate tutorial elements may be achieved "on-the-fly" through reference to specifications contained in a separate structured data document or results of an equivalent database query. For example, in a tutorial including a video presentation with related graphical or multimedia tutorial elements, a structured data document may contain information regarding timing of specific appearance of, text or images associated with each tutorial element. The structured data document may provide information allowing the education content platform to retrieve any tutorial element from server 106, or from a central or local database, computer file system, or content resident on the Internet.

The coordination of tutorial elements through a structured data document enables a flexible framework for content creation and modification. Changes made to the structured data document can be used to modify a resultant tutorial in several ways. For example, a new tutorial element may be added to a tutorial by simply including a file identifier specific to the new tutorial element in a structured data document. Furthermore, a tutorial element may be removed from the resultant tutorial simply by removing references to the tutorial element from the structured data document. In addition, tutorial elements that enable access to external or related content and/or branching points may be adjusted by editing the properties of the tutorial elements as defined in the structured data document.

In embodiments, each time a single tutorial is loaded, all tutorial elements are combined and coordinated "on-the-fly," as defined by the structured data document. While modification of the structured data document allows for simple modification of the timing and action of separate tutorial elements that make up the tutorial, the individual tutorial elements associated with each tutorial may be adjusted as well. New or modified tutorial elements may be included with the existing tutorial elements, and upon loading a modified structured data document, an updated tutorial may be created when it is next requested, with the new or modified tutorial elements included among the components of the updated tutorial.

In one embodiment, educators, trainers, or other content providers upload multimedia elements to a central or local database (e.g., server 106), and these elements are coordinated in individual tutorials that are delivered to users. In another embodiment, users upload multimedia elements to a central or local database (e.g., server 106), and these elements are coordinated in individual tutorials that are delivered to other users.

At 304, a first user interface that includes a plurality of regions that correspond to each of the plurality of tutorial elements is generated. Each of the plurality of regions may include a window that houses a presentation, a window that houses a continuously-updating diagram, and a summary window describing a tutorial. One of the plurality of regions may also include a window that includes synchronized tutorial elements. For example, a non-interactive video presentation may be synchronized and coordinated with a set of interactive graphical, video, or audio elements. The window that includes synchronized tutorial elements may be positioned in a scrollable frame around or adjacent to a video presentation.

In embodiments, a window housing a presentation may include a video of a person in front of a white board, blackboard, or similar presentation device. In another embodiment, the window housing the presentation may house a slide-show presentation with an audio overlay, an animation, or some combination of multimedia resources. For example the window housing the presentation may contain a recorded video of a person and have animated images superimposed over the video.

At 306, the first user interface is presented to a user on a display device (e.g., display 206). As mentioned above, different users may need to explore different levels of a tutorial at different stages of a lesson explained in the tutorial. Thus, the first user interface is configured to enable a user to tailor an experience of the tutorial to the user's own needs. For example, if a user if viewing a tutorial and either has a question regarding a particular tutorial element or desires to switch to a different tutorial, a user may request to access one or more additional tutorial elements (e.g., a tutorial element that further defines a selected tutorial element, or a different tutorial), and at 308 the request is received by processor 204.

Figure 4:
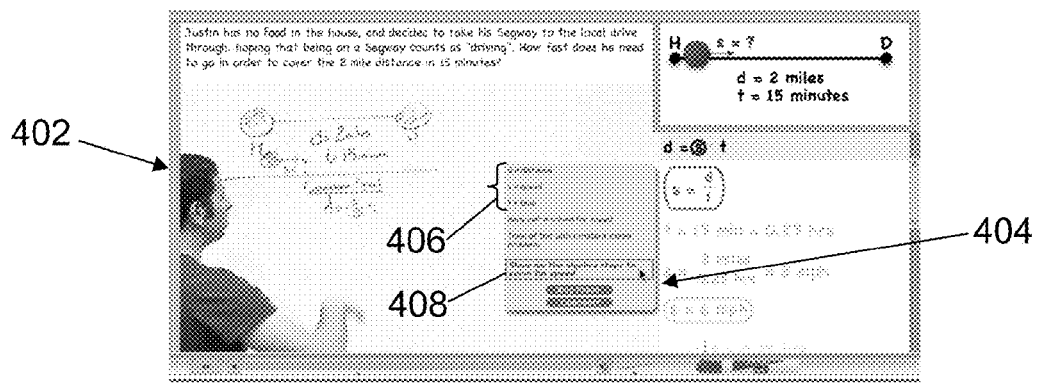
FIGS. 4-6 are illustrative interactive expandable multimedia tutorials for delivering related educational tutorials to a user, while maintaining the presence of each educational tutorial.

At 310, the one or more additional tutorial elements are accessed. As mentioned above, a tutorial element may include variables in an equation that a user does not understand. The user may select the particular tutorial element in question by, for example, using a mouse to "rollover" the tutorial element. Thus, accessing one or more additional tutorial elements is achieved upon the "rollover" and a superimposed window (see superimposed window 404 in first user interface 402 in FIG. 4) that includes text descriptors 406 that provide definitions for variables depicted in the tutorial element is presented to the user. In embodiments, superimposed window 404 may also include a link providing a user an option to skip forward in the present tutorial to a time point where a video file discusses a step in a problem solution associated with variables in question. In a further embodiment, a user may select a step in a lesson being described (e.g., a particular part of an equation) and virtual whiteboard system 100 re-synchronizes and/or re-coordinates a video with each interactive tutorial element related to the video with a point in the video that the video describes the selected step.

In embodiments, a link (not shown) in superimposed window 404 may provide access to a user-adjustable playhead position, which may be moved along a timeline in order to advance the tutorial to a desired point in a presentation. The user may also adjust the playhead position by selecting the timeline. When the playhead position is viewed relative to the timeline, the user may obtain an estimate of a relative time elapsed in the tutorial. This functionality allows a user to skip around the educational tutorial along key-frames defined by logical steps of a problem solution. Superimposed window 404 may further include an option to submit commentary or feedback to administrators of the virtual whiteboard system 100. For example, an image may be improperly synchronized to a video, an image may include a factual error, or an image may represents a logical step that a user finds confusing.

Additional graphic elements may indicate key time points in the tutorial, and may provide users with a visual representation of an overall structure of the tutorial. For example, in a tutorial that presents multiple solutions to a specific physics problem, separate colors may be used along a timeline so as to differentiate sections of the tutorial that provide a conceptual solution to the problem from sections of the tutorial that provide mathematical solutions to the problem.

Figure 5:
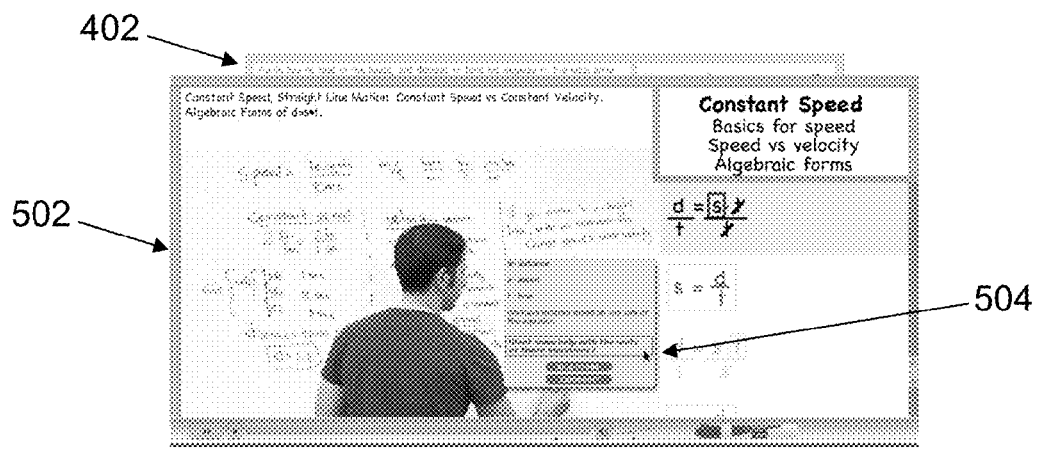

In one embodiment, superimposed window 404 may also include a link 408 to additional tutorials. Thus, in one embodiment, upon a selection of link 408 to additional tutorials, one or more additional tutorial elements are also accessed. For example, if the user is confused about algebra steps associated with deriving an expression depicted in an image, then the user may select a link that allows the user to view an additional educational tutorial, specific to algebra steps associated with the algebraic expression in question. Superimposed window 404 may include one or more hyperlinked text, image, video, or other multimedia elements that provide branching points to related tutorials or related piece of content. These branching points from an initial tutorial may link to related content not directly addressed in the initial tutorial. In one embodiment, related content is a tutorial that addresses a specific concern in greater detail. For example, a tutorial that details a lesson explaining a solution of a physics problem may include a video presentation synchronized with graphical elements that recapitulate concepts, equations, and logical steps presented in the video. A particular graphical elements that shows one of the equations may possess a link to a specific tutorial that details a derivation of the equation of interest. Thus, a user who desires additional assistance with, or who is curious to see more details about the equation of interest, may select the hyperlinked element, at which point a tutorial specific to that particular equation is generated at 312 and presented to the user superimposed over the initial tutorial at 314, as shown in FIG. 5. This additional tutorial is presented in a second user interface 502 that includes one or more regions that correspond to one or more additional tutorial elements related to the tutorial. Second user interface 502 is displayed simultaneously (e.g., superimposed) with first user interface 402, with at least a portion of first user interface 402 remaining visible to the user to enable the user to navigate between second user interface 502 and first user interface 402.

Figure 6:
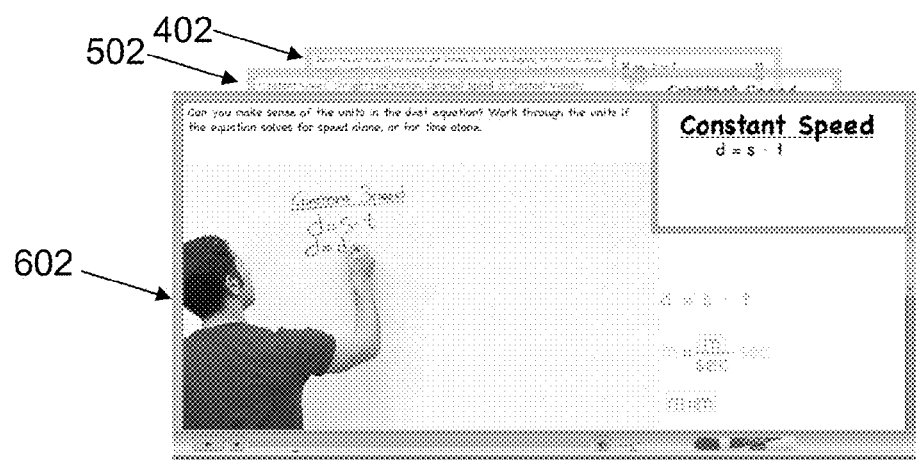

As shown in FIG. 6, another tutorial may also be presented in a third user interface 602, via superimposed window 504 (see FIG. 5). Third user interface 602 is displayed simultaneously (e.g., superimposed) with first user interface 402 and second user interface 502, with at least a portion of first user interface 402 and second user interface 502 remaining visible to the user to enable the user to navigate between third user interface 602, second user interface 502, and first user interface 402. One of ordinary skill in the art will appreciate that any number of user interfaces may be superimposed over each other with a portion of each user interface remaining visible to the user to enable the user to navigate between each of the interfaces.

A user may also select a tutorial from an expandable list, such as a table of contents with expandable subsections. In this manner, a user may find relevant content through sequential selections, via use of a mouse or some other means of interaction with interface component 212, of categories and subcategories that particular content belongs to. In one embodiment an organization of tutorial into categories and subcategories is provided by content providers. In another embodiment, the organizational structure is created or modified in response to user feedback or usage data.

In one embodiment, functionality may be provided allowing a user to save a linked tutorial to a user-managed queue for viewing at a later time. On the other hand, a user may choose not to pursue further details regarding the linked tutorial in question, and thus may continue without viewing additional tutorials.

Individual tutorials may also include associated keywords or tags, and may be indexed and made searchable through an index, table of contents, or other search structure. In one embodiment, a search list is dynamically populated with relevant tutorials in response to user input of tags or keywords. Once selected, a tutorial of interest is delivered to a user. In one embodiment, descriptive tags and keywords associated with particular educational tutorials or training modules are provided by content providers. In another embodiment, descriptive tags and keywords are automatically generated in response to user feedback or usage data.

In one embodiment, all organizational information, such as tags, keywords, and category listings, is stored in a database accessible by server 106. This database may be modified and adjusted directly or indirectly via other software by content providers, users, or other parties. In another embodiment, the organization information is stored in one or more structured data documents which, through the software design of the educational content platform, are automatically referenced as needed in order to provide responsive interaction to the user.

The educational content platform may be customized to increase an efficiency of a search through delivery of content highly relevant to specific pre-defined lines of user inquiry. For example, in a case where a user has a question about a specific homework problem, rather than a general curiosity about a theoretical concept, the user will have an opportunity to directly input, or select from a list, a homework problem that is found in a particular textbook. Thus, user interface component 210 enables a user interface to allow a user to search for educational tutorials which closely match a user-chosen homework problem of interest. With this user interface, users may direct their search in a bottom-up fashion: instead of searching through an index or table of contents by successive narrowing down of nested categories. Thus, a user with a particular homework problem in mind may simply input a reference to that problem. The search may then be queried to a database containing links between specific textbook problems from specific textbooks and highly relevant educational tutorials or modules. The educational content platform will then deliver some set of educational tutorials most directly related to the specific textbook problem in question.

More generally, content providers may create connections between some specific line of inquiry and educational content platform tutorials or modules most relevant to that particular line of inquiry. Thus a user may initiate search with a particular question in mind, rather than with a set of topics or keywords. This search approach represents a more bottom-up method than a typical top-down search that involves successive narrowing of categories and subcategories. This bottom-up search structure may be ideal for providing educational content in a setting where, for example, users all have similar patterned lines of inquiry. In such a setting, content providers may anticipate most common lines of inquiry and therefore predetermine which tutorials are best suited for any possible initial line of inquiry. For example, in the case described above with respect to homework problems, most relevant tutorials or modules that correspond to any particular textbook or other source problem may be provided in advance, either from user feedback, from content providers, or from some other party.

In embodiments, related content that is "called up" at branching points need not be another tutorial, but may simply include a link to an external web-site, or a related graphic, audio recording, image, or animation. In another embodiment, branching points may simply be time points where a tutorial pauses and a user is prompted to make a selection. However, regardless of the type of content delivered at tutorial branching points, the educational content platform is designed to deliver related content in such a way as to allow users to simultaneously pursue multiple parallel or branching inquiries. In one embodiment, this is achieved by pausing an initial application, e.g., a tutorial, when a branching inquiry is pursued, then resuming when the branching inquiry is completed, or when the user decides to go back to the initial tutorial. In embodiments, if a user chooses to click on a link to related content, then virtual whiteboard system 100 pauses the presentation of the tutorial indicated by item, places it in a background, and a new educational tutorial is loaded and begins to play, partially superimposed over the initial educational tutorial. In this way, a user has an ability to drill down to related content of interest without losing sight of the initial tutorial. One of ordinary skill in the art will appreciate that any number of user interfaces may be superimposed over a particular user interface, and therefore, a user may select any one of the superimposed tutorials at any time, and once selected, the selected tutorial may be resumed and brought to the foreground. An analysis of a pattern of related content that a user navigates through in this manner may provide a window into user learning gaps and interests, as well as information regarding user learning styles and behaviors.

In one embodiment, user interface component 210 is configured to enable one or more portions of each user interface presented to the user to be transparent. For example, as mentioned above, a user may be viewing an initial tutorial in a first user interface and request an additional tutorial that is presented to the user in a second user interface that is superimposed over the first tutorial (i.e., the first user interface). However, certain aspects of the first tutorial may be blocked from the view of the user by virtue of the second user interface being superimposed of the first user interface. Thus, user interface component 210 enables a user to select a transparency option, and upon a selection of the transparency option, one or more portions of the second user interface become transparent, enabling the user to view the first user interface. One of ordinary skill in the art will appreciate that any number of user interfaces may be superimposed over a particular user interface, and therefore, any number of user interfaces may be selected to be transparent in order to see the particular user interface.

Several aspects of a user's experience with the educational content platform may be tracked, stored, and accessed via user information component 214. For example, all tutorials that a user may search for, and all lines of inquiry that a user may pursue, can be stored in a database of user data. In one embodiment, this type of user data may be stored in a history queue to be retrieved by the user at a later date. Additionally, information regarding specific tutorials, such as a number of times a particular tutorial has been viewed, may be captured, stored in a database, and made available to a user at a later time and/or used by system administrators or content providers for various purposes. For example, a system administrator may adjust system resource allocation depending on system load, captured through usage data. Furthermore, content providers may utilize such usage data to better determine marketing strategies that are specific to their users.

As described above, more detailed tutorials may be superimposed over, or displayed alongside, existing tutorials, and this process of superposition, or multiple simultaneous display, may continue through several levels of tutorial hierarchy. Both a method by which a related tutorial is viewed, as well as information about the related tutorial itself, may be captured and stored in a user data database or preferences document. Thus each user's unique choices for relevant branch points may be tracked, stored, and utilized via user information component 214 for future retrieval or other purposes.

In embodiments, users may be provided with pre-defined superimposed prompts at any time during the presentation. A prompt may appear at a predetermined point in a tutorial, defined programmatically in a coordinating structured data document. In one embodiment, when a prompt appears, the tutorial is either stopped or paused. The prompt may also appear at a conclusion of the tutorial. The prompt may contain a variety of multimedia files, including text, animations, multimedia, video and audio. The prompt may provide an assessment specific to an educational tutorial or training module, and user response to a prompt may be captured and stored in a user database. For example, the assessment may include multiple choice questions, short answer questions, interactive animations, or other media designed to asses a user's understanding of some presented concept. In an embodiment, a set of assessments reside in a database or structured data document and are called up dynamically just as a tutorial may be dynamically generated. In a further embodiment, a user's answers to a particular assessment are stored in a user data database.

In addition to tracking user interaction with tutorials, direct user feedback in the form of written or oral commentary may also be solicited, monitored, stored, and retrieved at a later date. In one embodiment, user feedback is stored in a separate user data database. In another embodiment, user feedback is published to a message board for viewing by multiple users. The feedback may or may not first be reviewed by a content provider or other party prior to publishing for viewing by other users, and a determination of whether or not first to review the feedback may be affected by stored data about the user providing the feedback. For example, certain users may be conferred certain privileges with regard to the posting of feedback and may also be invited to assist in the moderation of feedback provided by other users.

Users may also elect to share feedback, commentary, resources, curricula, etc. with other users. In one embodiment, users may have an ability to upload new or modified tutorial elements. In another embodiment, users may share recommendations for useful tutorials given some line of inquiry, or for useful supplement content in the form of links to outside Websites. As in the case of feedback described above, any or all user-generated content may or may not first be reviewed by a content provider or other party prior to publishing for viewing by other users, and the determination of whether or not first to review content may be affected by stored data about the user providing the content. For example, certain users may be conferred certain privileges with regard to a posting of content and may also be invited to assist in a moderation of content provided by other users.

Usage data may include a collection of tracked user interactions with an educational content platform and may be stored in a database, a structured data document, or some other format. In an embodiment, this usage data includes but is not limited to which tutorials or modules a user has watched, queued, or reviewed, which branching points to related content a user has utilized, which selections a user has made for particular assessments or prompts, and what direct feedback a user has provided. Usage data may be compiled and analyzed in numerous ways, and results of such analysis may be utilized to provide additional resources to users. This functionality will be described in more detail below.

In an embodiment, usage data is utilized to adjust connections between particular lines of inquiry and specific tutorials or modules or sets of tutorials or modules. For example, if direct user feedback indicates that a particular tutorial or module is not relevant to a particular line of inquiry, then a connection between the application e.g., tutorial or module, and a line of inquiry may be adjusted so that future users with similar lines of inquiry are not directed to that particular tutorial or module. Indirect usage data may also be utilized to modify relevance and strength of connection between particular tutorials and particular lines of inquiry. For example, if a large set of users with the same line of inquiry consistently select branch points from a prescribed tutorial or module in order to obtain more details about a particular concept, topic, or logical step, then this may indicate that it would be more efficacious for users to be directed to the set of tutorials or modules called up in the branching points. The educational content platform may therefore adjust a connection between particular lines of inquiry and particular sets of tutorials or modules in a programmatically automated manner by applying algorithms to the aggregated usage data.

In an embodiment, usage data is utilized to programmatically determine and deliver relevant content to the user. For example, the set of branch points that users pursue from an initial tutorial or module may reveal which topics, logical steps, methods, or ideas may require additional clarification. Thus selected branch points may offer insight into which concepts or methods a user finds confusing. Based on this information, the educational content platform may deliver content optimized for an individual user. For example, tutorials or modules that emphasize the specific concepts or methods in question may be delivered to the user. In addition assessments or other multimedia content specific to concepts and methods in question may be delivered to the user.

Usage data and trends may also be utilized to provide additional information to users. In an embodiment, usage statistics are delivered directly to users. For example, a user may be directed to a set of tutorials or modules following a particular line of inquiry, and upon rolling over an icon for each recommended tutorial or module, may be provided with statistics regarding user interaction and experience with said tutorial or module. Thus users may be able to determine what number or percent of other users found particular tutorials or modules helpful or relevant.

In an embodiment, aggregated usage data and statistics are delivered to educators or trainers. For example, if the educational content platform includes a set of interlinked tutorials or modules that describe or support a solution of homework problems, then usage data may be compiled and sent to educators. In this manner, educators may be given insight into user patterns of learning; a significant percentage of users pursuing similar branching tutorials, or obtaining incorrect answers on similar assessments may suggest a specific shared gap in understanding, and educators may choose to tailor their lesson plans to address such gaps as may be revealed.

User compliance with required educational tutorials or modules may be assessed by analysis of usage data and statistics. For example, user interaction with a set of training modules may be quantified and statistically analyzed, and users with a set of interaction parameters sufficiently different from an average user may be monitored more closely, may be presented with additional assessments, or may be validated by some other means.

User data may be aggregated and analyzed to determine user-specific learning styles and needs. For example, users who routinely branch out to related content that is highly visual in nature may be considered to be visual learners, while users that consistently branch out to related content that provides active examples of concepts may be considered tactile learners. In an embodiment, a user's learning style is determined programmatically by the educational content platform by statistical analysis of usage data.

In one embodiment, a user's determined learning style may be stored for future reference in a database or structured data file via user information component 214. In a further embodiment, a user's learning style is used to deliver most relevant and useful content to the user. For example, a particular line of inquiry may have several associated modules and tutorials, and these modules or tutorials may be designed with different learning styles in mind. If a user's learning style is known, then a most appropriate tutorial or module may be delivered. Furthermore, a user's determined learning style may be reported to third parties, such as tutoring services or educators, so that users may be provided with support specific to their learning style.

In one embodiment, a user may be provided with a set of tutorials that are ranked according to relevance in response to a specific line of inquiry. The relevance of related tutorials may be predetermined by content providers. In another embodiment, the relevance of related tutorials may be determined through user feedback or usage data. For example, content that users report as being beneficial following a particular line of inquiry may have the content ranking increased according to an algorithm. In an embodiment, lines of inquiry and the lines related tutorials and ranks are stored in a database.

In addition to being given specific links between particular lines of inquiry and relevant tutorials, users may be prescribed a set of tutorials by external parties. In this manner a specific curriculum may be chosen by outside parties for users to follow. For example, in the case described above, an educator may assign to a user or to a set of users some arbitrarily chosen set of tutorials. In one embodiment, one or more lists of tutorials or modules including one or more recommended curricula are stored in a database. In embodiments, tutorial recommendations or curricula may be generated from external parties, content providers, or other users.

Tutorial recommendations may also be generated in response to user input. For example, a user may be prompted with an assessment related to presented educational material, and the results of the assessment may be utilized to determine what content is most relevant to deliver to the user. In an embodiment, depending on programmatically defined criteria, users obtaining incorrect answers upon assessment may be directed to a predetermined set of remedial educational modules or tutorials, while users obtaining correct answers may be directed to a set of more challenging educational tutorials or assessments.

EXEMPLARY OPERATING ENVIRONMENT

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions embodied in one or more computer-executable components stored on one or more computer-readable media to implement aspects of the invention described and/or illustrated herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for creating an interactive expandable multimedia tutorial, the system comprising:
a memory area for storing tutorial elements and user information; and a hardware processor programmed to:
access a plurality of tutorial elements from the memory area, wherein the plurality of tutorial elements includes a first tutorial element and one or more branching points from the first tutorial element, wherein the one or more branching points are used to access different content associated with the first tutorial element in response to a request to access the different content, and wherein at least one of the plurality of tutorial elements comprises a video of a presenter describing a lesson;
generate a first user interface comprising a plurality of regions, at least one of the regions corresponding with the first tutorial element;
receive a request to access the different content associated with the first tutorial element;
pause the first tutorial element comprising the video upon receiving the request to access the different content associated with the first tutorial element;
access the different content associated with the first tutorial element;
generate a second user interface comprising one or more regions that correspond to the different content associated with the first tutorial element, wherein the second user interface is configured to be superimposed over the first user interface, and wherein at least a portion of the first user interface is configured to remain visible to a user to enable navigation between the second user interface and the first user interface to access the first tutorial element and the different content associated with the first tutorial element;
receiving written or oral feedback from the user; and
adjusting at least one of the plurality of tutorial elements or one or more branching points in response the feedback.

2. The system in accordance with claim 1, wherein the video further comprises audio of the presenter describing the lesson.

3. The system in accordance with claim 1, wherein the lesson comprises at least one of a solution to a problem, a demonstration of a principle, an argument, an equation, and a logical expression.

4. The system in accordance with claim 1, wherein the video comprises the presenter writing the lesson on a whiteboard.

5. The system in accordance with claim 1, wherein the video is in a first region of the plurality of regions, and wherein the video is synchronized and/or coordinated with an interactive tutorial element in a second region of the plurality of regions, the interactive tutorial element comprising an image related to the lesson.

6. The system in accordance with claim 5, wherein the image represents one of a logical step or a conceptual point related to the lesson.

7. The system in accordance with claim 5, wherein synchronizing and coordinating the video with the interactive tutorial element comprises updating the region comprising the interactive tutorial element with a successive iteration of the lesson with each successive part of the lesson that the presenter describes.

8. The system in accordance with claim 7, wherein updating the region comprising the interactive tutorial element with a successive iteration of the lesson comprises highlighting portions of the image corresponding to relevant steps in the lesson.

9. A method for creating an interactive expandable multimedia tutorial, the method comprising:
   receiving, by a processor, a plurality of tutorial elements, wherein at least one of the plurality of tutorial elements is configured to receive a request for access to one or more additional tutorial elements, wherein the plurality of tutorial elements include a first tutorial element that is configured to receive the request to access the one or more additional tutorial elements, wherein the plurality of tutorial elements include one or more branching points associated with the first tutorial element, and wherein the one or more branching points are used to access different content associated with the first tutorial element;
   generating a first user interface comprising a plurality of regions that correspond to at least one of the plurality of tutorial elements, including the first tutorial element;
   presenting the first user interface on a display device;
   receiving, from a user, a request to access the different content associated with the first tutorial element;
   accessing the different content associated with the first tutorial element;
   generating a second user interface comprising one or more regions that correspond to the different content associated with the first tutorial element;
   presenting the second user interface on the display device, wherein the second user interface is displayed simultaneously with the first user interface, and wherein at least a portion of the first user interface remains visible to the user to enable navigation between the second user interface and the first user interface to access the first tutorial element and the different content associated with the first tutorial element;
   receiving written or oral feedback from the user; and
   adjusting at least one of the plurality of tutorial elements or one or more branching points in response the feedback.

10. The method in accordance with claim 9, wherein at least one of the plurality of tutorial elements comprises a video of a presenter describing a lesson.

11. The method in accordance with claim 10, wherein the video is in a first region of the plurality of regions, and wherein the video is synchronized and/or coordinated with an interactive tutorial element in a second region of the plurality of regions, the interactive tutorial element comprising an image comprising each step of in the lesson.

12. The method in accordance with claim 11, further comprising:
   enabling a user to select a step in the image comprising each step in the lesson; and
   re-synchronizing and/or re-coordinating the video with the interactive tutorial element at a point in the video that the video describes the selected step.

13. The method in accordance with claim 11, wherein the video further comprises the presenter writing the lesson on a whiteboard.

14. The method in accordance with claim 13, further comprising updating the region comprising the interactive tutorial element with a successive iteration of the lesson with each successive step of the lesson that the presenter writes.

15. The method in accordance with claim 11, further comprising:
   receiving, from the user, a selection of the at least one of the plurality of tutorial elements configured to enable access to one or more additional tutorial elements;
   presenting a superimposed window comprising a link to the one or more additional tutorial elements.

16. The method in accordance with claim 15, wherein the superimposed window further comprises at least one of: a definition of one or more variables depicted in one of the plurality of tutorial elements, and an option to leave a comment.

17. The method in accordance with claim 11, further comprising:
   receiving, from a user, a request to access one or more further additional tutorial elements;
   accessing the one or more further additional tutorial elements;
   generating one or more additional user interfaces comprising one or more regions that correspond to each of the accessed one or more further additional tutorial elements; and
   presenting the one or more additional user interfaces on the display device, wherein the one or more additional user interfaces are displayed simultaneously with the first user interface and the second user interface, and wherein at least a portion of each user interface remains visible to the user to enable navigation between the first user interface, the second user interface, and the one or more additional user interfaces.

18. One or more non-transitory computer-readable media having computer-executable components, said components comprising:
   a tutorial element component that when executed by at least one processor causes the processor to receive a plurality of tutorial elements including a first tutorial element and one or more branching points from the first tutorial element, wherein at least one of
   the plurality of tutorial elements comprises the first tutorial element and the one or more branching points from the first tutorial element, wherein the one or more branching points are used to access different content associated with the first tutorial element in response to a request to access the different content, and comprises a video of a presenter describing a lesson;

a user interface component that when executed by at least one processor causes the processor to generate a first user interface comprising a plurality of regions, at least one of the regions corresponding with the first tutorial element;

a display component that when executed by at least one processor causes the processor to present the first user interface on a display device; and an interface component that when executed by at least one processor causes the processor to, receive, from a user, a request to access the different content associated with the first tutorial element and pause the first tutorial element comprising the video upon receiving the request to access the different content associated with the first tutorial element;

wherein the user interface component further causes the processor to access the different content associated with the first tutorial element;

wherein the user interface component further causes the processor to generate a second user interface comprising one or more regions that correspond to the different content associated with the first tutorial element;

wherein the display component further presents the second user interface simultaneously with the first user interface, and wherein at least a portion of the first user interface remains visible to a user to enable navigation between the second user interface and the first user interface to access the first tutorial element and the different content associated with the first tutorial element; and wherein the user interface component further causes the processor to receive written or oral feedback from the user and adjust at least one of the plurality of tutorial elements or one or more branching points in response the feedback.

19. The non-transitory computer-readable media in accordance with claim 18, wherein upon a selection from the user to resume the paused video, the video continues from a point from which the video paused.

20. The non-transitory computer-readable media in accordance with claim 18, further comprising instructions that when executed by a processor cause the processor to:

receive, from a user, a search request of an additional tutorial; and provide a user with a set of tutorials that are ranked according to relevance in response to the search request.

21. The method in accordance with claim 9, further comprising:

receiving usage data from a plurality of users that receive the content, wherein the usage data comprise tutorials the users watched, queued, or reviewed, branching points utilized by the users, selections the users made for a particular assessment or prompt, or feedback the users provided.

22. The method in accordance with claim 21, further comprising:

aggregating the received usage data; and electronically sending the aggregated usage data to educators or trainers associated with a lesson included in at least one of the plurality of tutorial elements.

* * * * *